United States Patent [19]

Snedeker

[11] Patent Number: 4,923,728
[45] Date of Patent: May 8, 1990

[54] PROTECTIVE ARMOR AND METHOD OF ASSEMBLY

[75] Inventor: Richard S. Snedeker, Cranbury, N.J.

[73] Assignee: Titan Corporation, San Diego, Calif.

[21] Appl. No.: 410,019

[22] Filed: Sep. 20, 1989

Related U.S. Application Data

[63] Continuation of Ser. No. 267,826, Nov. 7, 1988, abandoned.

[51] Int. Cl.⁵ .......................... B32B 3/10; B32B 3/22
[52] U.S. Cl. ..................................... 428/52; 428/911; 2/2.5
[58] Field of Search ...................... 428/44, 52, 48, 49, 428/911; 2/2.5

[56] References Cited

U.S. PATENT DOCUMENTS 3,924,038 12/1975 McArdle et al. .................. 428/911
4,292,882 10/1981 Clausen .................................. 2/2.5

Primary Examiner—Alexander S. Thomas
Attorney, Agent, or Firm—Larson and Taylor

[57] ABSTRACT

Protective armor in which the core is an assemblage of tiles, preferably of ceramic material, arranged in edge-to-edge relationship in a checkerboard pattern, and a series of tapes, preferably of fiberglass fabric, interwoven in a zig-zag path longitudinally and transversely over and under the tiles in each row, the assembly being bonded together by a cured synthetic resin impregnated into the tapes. A novel method of interweaving the tapes and tiles is disclosed.

14 Claims, 3 Drawing Sheets

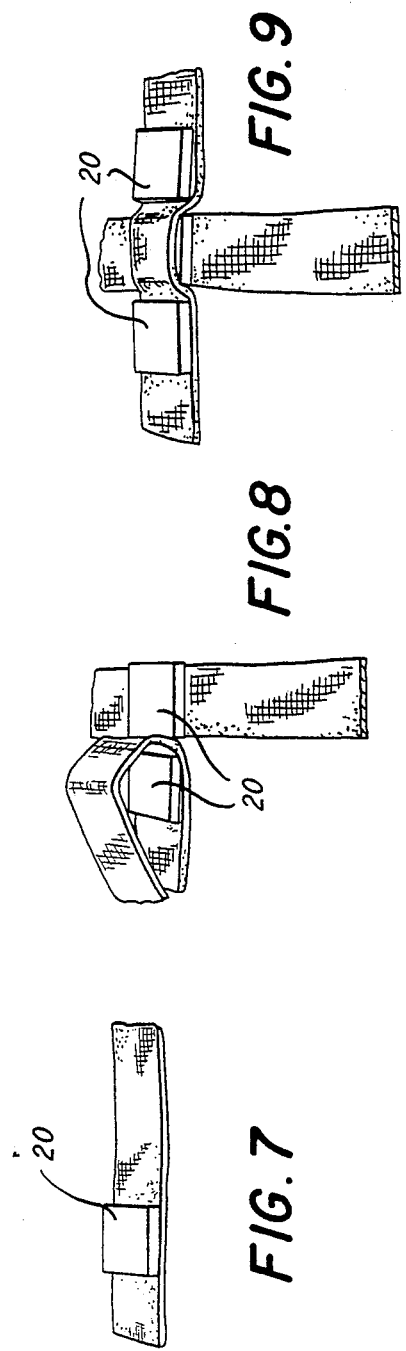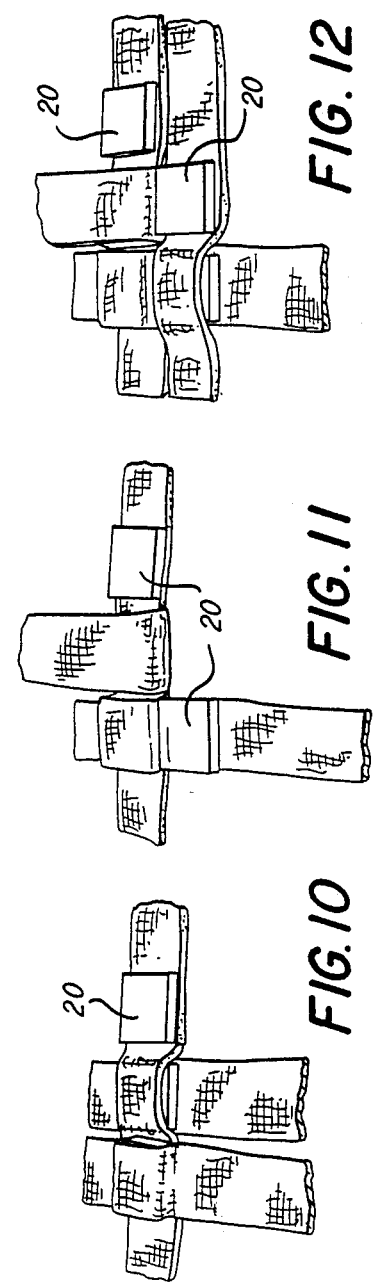

4,923,728

PROTECTIVE ARMOR AND METHOD OF ASSEMBLY

This application is a continuation of application Ser. No. 267,826, filed Nov. 7, 1988, now abandoned.

TECHNICAL FIELD

This invention relates to a novel armor construction utilizing ceramic or metal tiles and fabric tapes interwoven in a zig-zag path through the tiles, and to a method of assembling the tiles and tapes.

BACKGROUND ART

There is a considerable body of patented art disclosing armor formed of rigid elements combined with a layer of flexible material surrounding or supporting the individual elements. For example, Haupt et al, U.S. Pat. No. 4,198,707 discloses a plurality of interlocking or overlapping plates inserted in pockets in a vest.

McArdle et al, U.S. Pat. No. 3,924,038 discloses a plurality of tiles bonded to cloth and a metal back plate.

Clausen et al, U.S. Pat. No. 4,186,648 discloses fabric laminates with a filler of particulate metal abrading material.

Brandt U.S. Pat. No. 4,633,528 discloses a flexible sheet of material enclosing overlapping plates having sloping surfaces designed to deflect a projectile from its original flight path.

Fritch U.S. Pat. No. 4,660,223 discloses panels of titanium metal bonded to aramid fiber woven cloth.

Dunn U.S. Pat. No. 4,483,020 discloses a network of interlocking plates under a layer of impact absorbing material.

Alesi U.S. Pat. No. 3,867,239 discloses an array of platelets with contoured edges supported by a flexible membrane.

David U.S. Pat. No. 3,894,472 discloses a plurality of flat metal plates secured on opposite sides of a sheet.

Klein U.S. Pat. No. 4,241,457 discloses a hinged arrangement of partially overlapping panels with a fabric covering.

Smith U.S. Pat. No. 4,732,803 discloses an outer initial impact layer of metal, ceramic carbide, or glass fiber backed by a lamina-like structure of resinous material and/or fibers.

Harpell U.S. Pat. No. 4,613,535 is generally similar to the disclosure of the Smith patent.

Rudoi U.S. Pat. No. 4,473,653 describes a ceramic formulation with potential for armor applications.

None of the prior patents or other disclosures teach structure according to the present invention, in which tapes, that is, narrow strips of fabric, are interwoven between tiles to provide structural continuity from the front surface to the back surface. This is the type of continuity provided by a conventional honeycomb structure, and is what gives honeycomb its rigidity and high resistance to bending.

DISCLOSURE OF THE INVENTION

The present invention comprises a protective armor of which the core comprises an assemblage of approximately equal size, preferably square, flat, relatively small tiles, preferably of ceramic, arranged in edge-to-edge relationship in a checkerboard pattern. A series of fabric tapes, preferably of fiberglass, are interwoven in a zig-zag path longitudinally and transversely over and under the tiles so as to form webs of fabric that are continuous through the layer of tiles. The assembly is bonded together by a cured synthetic resin impregnated into the tapes. This is the essence of the inventive structure. An ingenious method of interweaving the tapes and tiles is also provided.

BRIEF DESCRIPTION OF THE DRAWINGS

FIGS. 7-12 are perspective views showing the initial steps in forming the zig-zag tape and tile construction.

MODES OF CARRYING OUT THE INVENTION

The invention provides a structural armor, that is, one intended for use where it acts by itself as a structural member in an assembly that must take loads such as axial, shear and bending. While the invention can use other types of tiles, it is particularly useful with nonmetallic tiles, preferably ceramic tiles, These have the advantage of nondetectibility by radar. Ceramics, however, are brittle, so that they cannot be used structurally without support from another source. When the choice is ceramic, the present invention provides a unique way of providing that support.

Armor according to the present invention is not a soft or flexible armor. After the resin impregnation it is a rigid, high strength structure. Rigidity can be controlled to some extent by the fabric-resin combination, but this is a secondary consideration. There is some flexibility before curing of the impregnating resin, hence the structure can be formed into shapes with complex curvature, for use, for example, as body armor, airplane armor or boat armor, where light weight is important.

Figure 1:
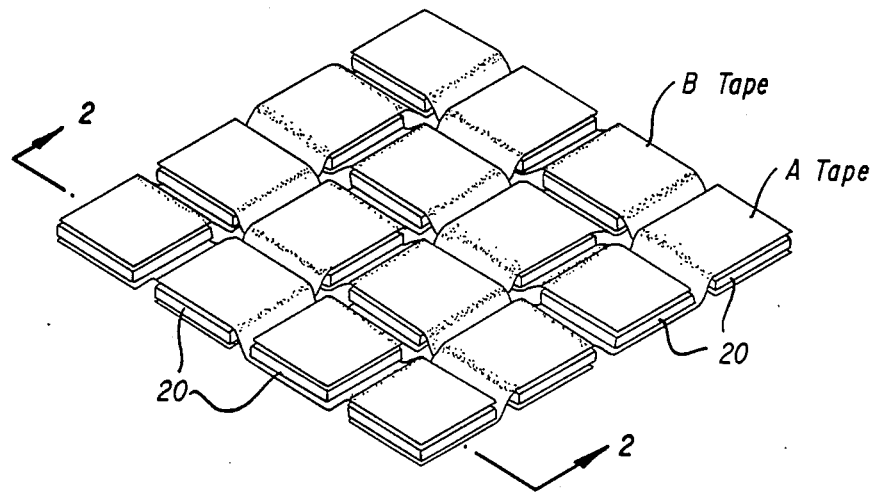
FIG. 1 is a perspective view of a portion of an armor construction according to the invention, showing the web-forming weave of A and B tapes.
Figure 2:
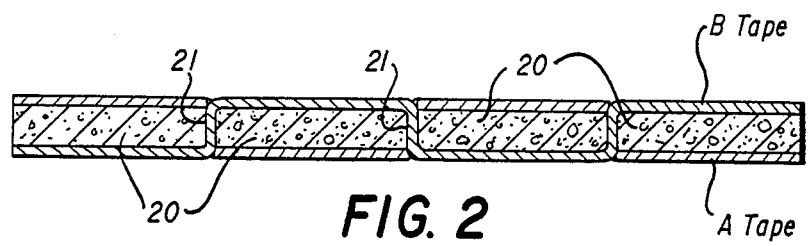
FIG. 2 is a cross-sectional view taken on line 2—2 of FIG. 1 after lateral contraction.

Referring now to the drawings, FIG. 1 shows a panel construction according to the invention in which sixteen tiles 20 are mounted in a flat array and checkerboard fashion with "A" tapes interwoven with them in a zig-zag pattern in one direction, and "B" tapes interwoven in similar fashion transversely to the "A" tapes. It will be seen that the tiles are of approximately equal size and arranged in edge-to-edge relationship in a checkerboard pattern such that the tiles are arranged in "longitudinal" and "transverse" rows. The number of tiles is not critical, except that their size within a given panel area is related to the multiple impact spacing requirement of the armor, as will be discussed below. In FIG. 1, the assembly is loosely formed as it is during the assembly operation, whereas FIG. 2 shows the compact structure after lateral contraction of the assembly. It is seen that a portion of each "A" and "B" tape forms a web 21 connecting the upper and lower surfaces.

Figure 3:
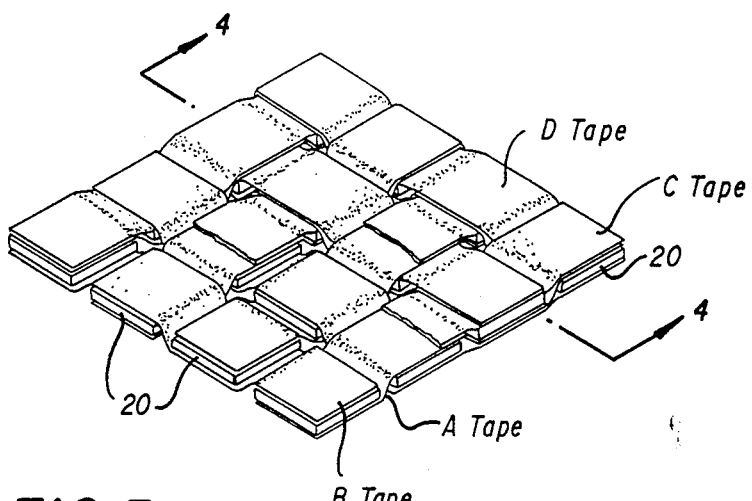
FIG. 3 is a perspective view similar to FIG. 1, but showing not only the basic A and B tapes, but also further tapes shown at C and D interwoven with the A and B tapes on the upper surface.
Figure 4:
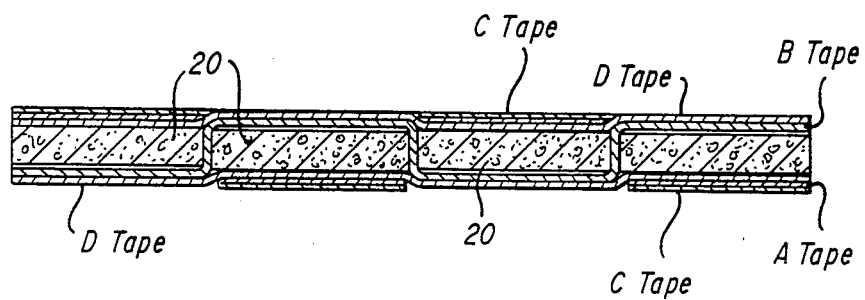
FIG. 4 is a cross-sectional view taken on line 4—4 of FIG. 3, after lateral contraction, and showing the interwoven C and D tapes added to both the upper and lower surfaces.

In FIG. 3, "C" and "D" tapes have been interwoven into the tapes on the upper surface or face of the assembly, the "C" tapes extending in the direction of the "A" tapes, and the "D" tapes extending in the direction of the "B" tapes. Similar to FIG. 1, FIG. 3 shows the structure before lateral contraction. FIG. 4 shows the FIG. 3 construction after lateral contraction and with "C" and "D" tapes added to both surfaces.

"C" and "D" tapes are added in the desired number on one or both sides of the assembly to achieve the desired thickness and strength. There can be several such tapes on each side. Also, each "A" and/or "B" tape may be several tapes thick. The "C" and "D" tapes contribute substantial added tensile and compressive strength to the front and back surfaces and contribute substantially to resisting tensile, compressive and bending loads in the finished panel.

In assembling the construction shown, as will be discussed in more detail below, the tapes are laid down with excess tape at each end. By pulling the tapes tight and placing the preliminary assembly in a frame, lateral contraction is achieved.

Figure 5:
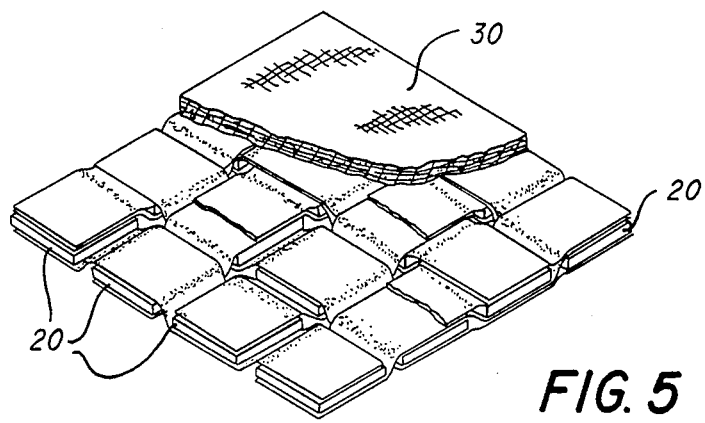
FIG. 5 is a view similar to FIG. 1, but showing prewoven face plies forming a "plate" on the upper surface of the assembly.

FIG. 5 shows the FIG. 3 construction with added prewoven face plies 30 on the upper surface. In the construction tested (see below), woven roving fabric plies were added to each face of the assembly in order to provide better comparability to the one-piece ceramic laminate panel with which the test sample was compared. Such woven roving is generally used on the faces of one-piece ceramic armor panels because of the need to support the ceramic as it shatters during impact by a projectile. Also, these fabric plies on the front and back provide additional structural strength and rigidity.

The initial steps in assembling the tile and tape construction are shown in FIGS. 7-12. It is believed that these indicate adequately the assembly steps, which are continued with additional tiles and tapes to construct an assembly of the desired size.

As shown in FIG. 7, a first tape "A" is laid down on a surface. Near the end of the tape, a tile is laid on it. In FIG. 8, a tape "B" has been laid down and a tile placed on it next to the first-mentioned tile. The first tape has been folded back before laying down tape "B" and placing the tile on it. In FIG. 9, tape "A" has been returned to the flat surface and has overlain the tile placed on tape "B" and a additional tile has been placed on tape "A".

In FIG. 10, another tape "B" has been added, overlying the first-mentioned tile, and a tile has been placed on this tape in FIG. 11. With the initially added tape "B" folded back, a second tape "A" is added in FIG. 12, overlying the tile added in FIG. 11. The initial tape "B" has been folded back and a tile added on the second tape "A".

This manner of assembly continues until a construction of the desired number of tiles and tapes has been achieved. The "C" and "D" tapes are then added by weaving them over and under the "A" and "B" tapes as shown in FIG. 3.

Figure 6:
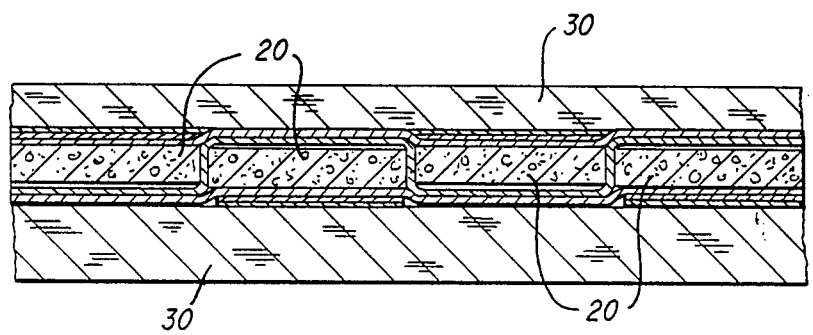
FIG. 6 is a cross-sectional view of a construction similar to that shown in FIG. 5, but with prewoven face plies forming plates on both surfaces.

In order to test the invention, several panels were constructed according to the invention. These panels were designed as armor targets to be tested by both ballistic impact and structural bending loads. These are referred to as "WISL" targets, for Woven Integrated Structure Laminate. Construction took place in two primary steps. First the tiles were assembled with the tapes as illustrated in FIGS. 7-12. This core assembly was then incorporated with woven roving plies constituting the front and back faces or plates as shown in FIGS. 5 and 6.

When the tiles and tapes had been assembled, this core assembly was constrained laterally in a four-piece Teflon frame. This frame kept the tiles pressed against the tapes to minimize the resulting lateral dimensions and to keep the web portions 21 of the "A" and "B" tapes perpendicular to the target surface. Resin was applied by brush to the core assembly and allowed to wick into the tapes between the tiles. A resin was used that required an elevated temperature for curing. It thus remained liquid at room temperature during assembly of the tapes. Alternatively, the resin could have been applied by spraying or by being forced into the fabric under pressure as in a "resin transfer" process. Tapes pre-impregnated with resin could also be used.

Plies of woven roving fabric were then laid up on the back of the assembly, applying resin by brush to each ply. The target was assembled in an aluminum box designed to fit between the platens of a heated press used for curing of the resin. After completion of the lay-up, the box was closed at the top with bagging film and then evacuated. This provided the initial laminating pressure and removed entrapped air. The box was then transferred to the press where mechanical pressure of 175 lb./sq.in. was applied and the assembly temperature raised to 225° F. for curing. The assembly was removed from the press and the box after 30 minutes, and the frame was removed.

Several WISL armor samples were made. Each consisted of 28 tiles of AD-85 sintered aluminum oxide, tile size $1.25 \times 1.25 \times 0.360$ inch, typical tile weight 31.3 g. The assembly was 4 tiles by 7 tiles, total width about 5.15 inches and length 9.10 inches. The sintered aluminum oxide tiles were manufactured by Coors Porcelain Co. of Golden, Colo.

Two types of fabric were used, a $4 \times 5$ count fiberglass woven roving weighing 24 ounces per square yard used for the face plies, and a $17 \times 18$ count fiberglass woven tape weighing 8.5 ounces per square yard and 1¼ inch wide used for the A, B, C and D tapes. The fabrics were conditioned for use with polyester resin.

The resin used was Dion Iso 6325, an isophthalic polyester manufactured and supplied by Koppers Co., Pittsburgh, Pa. When used with 1% benzoyl peroxide catalyst, this resin cures in about 10 minutes at 200° F.

The WISL targets tested typically consisted of, from front to back, two piles of 24-oz. woven roving forming the front plate, two interwoven surface plies of 8.5-oz. tape (these are the "C" and "D" tapes shown in FIGS. 3-5), three web plies of 8.5-oz. tape (these are the "A" and "B" tapes of FIGS. 1-5), the tile assembly, two interwoven surface plies ("C" and "D" tapes) of 8.5-oz. tape on the back, and seven plies of 24-oz. woven roven forming the back plate. One alternative construction had four interwoven surface plies on the front and back, two web plies on front and nine face plies on the back. Another construction had four interwoven surface plies on front and back, three web plies, two face plies on front, and seven face plies on back.

The lateral size of the tiles in such an armor design is related to the criterion used for multiple-impact performance. Typically, it may be required that a second impact be sustained within four projectile diameters of a first impact. In such a case a tile size of four projectile diameters would be chosen. Thus, the tile size of 1.25 in.

was about four times the diameter of the 0.30-caliber bullet to be used in the ballistic tests of the target.

In order to provide a basis of comparison, targets made of a single ceramic brick with fiberglass laminates were also constructed. The brick was of the same AD-85 material, measuring 5×8.74×0.360 inches. It thus contained the same amount of ceramic as the 28 tiles in a WISL target. The brick was laminated on the front side with three plies of 24-oz. woven roving and two plies of 8.5-oz. fabric, and on the back with two plies of 8.5-oz. fabric on top of which were nine plies of 24-oz. woven roving, all of fiberglass. The two plies of 8.5-oz. fabric directly on each side of the brick were intended to simulate the presence of the tapes on the ceramic surfaces of the WISL targets. The fabric plies were applied with brushed on resin as described above in connection with WISL manufacture, and the additional construction steps were the same.

The areal density of the two sets of targets was essentially the same, about 9 lbm/ft$^2$. The resin content of the reference targets ran from about 6 to 20%; for the WISL targets it was 11 to 25%. The overall thickness of the two sets of targets was from 0.62 to 0.65 in. for the reference targets, and from 0.62 to 0.68 in. for the WISL targets.

Destructive bending tests were first performed on one specimen of each type target. They revealed that the WISL construction provides superior load bearing ability through a substantially greater range than does the single-tile laminate of the same areal density, and that the latter loses most of its stiffness and strength when the ceramic breaks. The WISL construction, in contrast, retains much of its stiffness and strength as a result of its honeycomb construction and the fact that the ceramic is in small pieces to begin with. The small tiles do not break under load and continue to help support the fiberglass-resin matrix even after it is distorted as a result of hinge formation at the gaps between the tiles during application of the bending load.

Impact tests were then conducted on the remaining targets with 0.30-caliber APM-2 bullets, using impact velocities of about 75% of muzzle velocity in order to ensure that the targets would not be overmatched easily and that they would thus have to absorb the full kinetic energy and momentum of the projectile. In this way, it was expected that the widest zone of damage would be produced. The impact point was chosen to be slightly off center on one of the central tiles of the WISL target and at the same geometric location on the single-brick target. The impact obliquity was 0°.

The comparative impact tests revealed that all of the targets stopped the projectile except two of the lower resin content WISL targets, which were marginally defeated in that the target was barely perforated.

For the single-tile laminate targets, typical damage was:
1. Widespread edge-to-edge fracturing of the core brick;
2. Debonding of core fragments from the front and/or back plates; and
3. Delamination of back plate plies from each other over an area extending several inches from the impact point.

For the WISL targets, characteristic results were:
1. Core damage confined to the impacted tile;
2. Delamination of the back plate as a unit from the core assembly; and
3. Delamination of the back plate plies from each other in a region extending several inches from the impact point.

In a single-brick laminate target, the single large ceramic brick is initially supported by the entire back plate, so that, until it cracks on impact, it is capable of producing a very large pressure on the projectile for a brief time. This pressure is partially relieved by venting through the hole in the front plate, thus producing shredding and petaling of the fabric layers. In a WISL target, however, the impacted core tile is initially more yielding since it is much smaller and is connected to the remainder of the core only through the interwoven web structure. This allows the impacted tile to move slightly within the supporting structure, with the result that the impact pressure pulse is of lower magnitude and longer duration. Thus, the pressure-induced petaling is much less severe. A desirable consequence of this reaction, of course, is that only the impacted tile is damaged, since the others are protected by the shock absorbing properties of the WISL structure. For both types of target, the pressure produced on the bullet by the ceramic on impact is sufficient to break the bullet and thus impede its progress through the target. In the single-brick target, the result is that the entire brick is fractured throughout the entire area of the target. In the WISL target, only the impacted tile is broken.

Post-impact bending tests indicated that the WISL targets retained greater residual stiffness than the single-brick laminate targets, in most cases of the order of four times greater. The best WISL target retained stiffness of the order of nine times that of the poorer single-brick targets.

While the overall level of retained stiffness was clearly higher for the WISL targets, it is noted that this superiority would likely have been greater in a target design with more longitudinal tapes and tiles. With the WISL targets having only four tiles abreast, there were only three joints or webs, two of which were damaged on impact. Thus, the narrow cross-section was a relative disadvantage in this type of test. Had the single-brick targets, on the other hand, been wider, they would still have fractured from edge-to-edge and the loss of stiffness would have been just as great.

Of major importance in the impact test results was that the WISL interwoven tape design effectively isolates the damage to the single impacted tile, so that the armor remains effective against subsequent projectile impacts on the other tiles, which would not be the case for the single-brick laminate because of the shattering of the brick throughout the entire area of the target.

The invention has been described with reference to an example of a preferred embodiment. However, it will be appreciated that variations and modifications can be effected within the ordinary skill of the art without departing from the scope of the invention. For example, the interweaving of web and surface ply tapes can be adapted to tiles of other shapes, such as hexagons. The terms "longitudinal" and "transverse" are used only to differentiate the two directors for the square-shaped tiles used, and do not necessarily relate to the dimensional relation of the two directors. Those terms are to be understood to mean, respectively, "in a first direction" and "in a direction at 90 to said first direction".

It will also be appreciated that a panel constructed according to the invention may also be used for purely structural purposes, rather than as armor, and that in such an application the ceramic tiles may be replaced by similarly shaped pieces of any material suitable to the application. For example, for a lightweight structure, pieces of a rigid plastic foam could be used to support the tapes during assembly and resin cure. The resulting structure could be made to have properties similar to those of conventional honeycomb. The WISL construction according to the invention is, in fact, an alternate way of constructing honeycomb and should have a similar range of applications.

What is claimed is:

1. A protective armor comprising:
   an assemblage of approximately equal size, flat, relatively small tiles arranged in edge-to-edge relationship in a checkerboard pattern such that the tiles are situated in longitudinal and transverse rows,
   a series of first fabric tapes interwoven in a zig-zag path through each longitudinal row of tiles so as to pass over alternate tiles in the row and under the other tiles in the row, and
   a series of second fabric tapes interwoven in like fashion through each transverse row of tiles so as to cover each tile on the side opposite that covered by the first fabric tapes.

2. A protective armor according to claim 1, and a series of additional fabric tapes extending along the rows and interwoven with the first and second tapes along at least one face of the tile assemblage.

3. A protective armor according to claim 1, wherein said tiles are ceramic.

4. A protective armor according to claim 1, and woven textile material adhered to each surface of said assemblage over said tapes.

5. A protective armor according to claim 1, wherein said tapes are fiberglass.

6. A protective armor comprising:
   an assemblage of approximately equal size, flat, relatively small tiles arranged in edge-to-edge relationship in a checkerboard pattern such that the tiles are situated in longitudinal and transverse rows,
   a series of first fabric tapes interwoven in a zig-zag path through each longitudinal row of tiles so as to pass over alternate tiles in the row and under the other tiles in the row,
   a series of second fabric tapes interwoven in like fashion through each transverse row of tiles so as to cover each tile on the side opposite that covered by the first fabric tapes, and
   a cured synthetic resin impregnated in said tapes.

7. A protective armor according to claim 6, wherein resin impregnation takes place after assembly of the tape and tile construction.

8. A protective armor according to claim 6, wherein said tiles are ceramic, said tapes are of fiberglass, and said resin is of the thermosetting type.

9. A protective armor according to claim 8, and additional such tapes interwoven with the first and second tapes on at least one face of the assemblage.

10. A protective armor according to claim 9, and a plurality of layers of woven fiberglass roving adhered to the front and back surfaces of said assemblage over said tapes.

11. A protective armor according to claim 6, wherein said tiles are sintered aluminum oxide of the order of 0.360 inch thick and $1\frac{1}{4}$ inch square, the resin being an isophthalic polyester catalyzed with benzoyl peroxide, said tapes being of fiberglass.

12. A protective armor according to claim 11, and a plurality of layers of woven fiberglass roving adhered to the front and back surfaces of said assemblage over said tapes, said roving being $4\times5$ count and weighting 24 ounces per square yard, said fiberglass tape being $17\times18$ count and $1\frac{1}{4}$ inch wide weighing 8.5 ounces per square yard.

13. A protective armor according to claim 6, wherein the tape and tile assembly is held in a desired conformation during impregnation and curing of the resin.

14. A structural panel comprising,
    a plurality of tiles disposed in edge to edge relationship in a checkerboard pattern such that the tiles are disposed in longitudinal and transverse rows,
    a series of first fabric tapes interwoven in a zig-zag pattern through each longitudinal row of tiles,
    a series of second fabric tapes interwoven in a zig-zag pattern through each transverse row of tiles so as to cover each tile on the side opposite that covered by the first fabric tapes, and
    a series of third and fourth fabric tapes interwoven with the first and second tapes in the longitudinal and transverse directions, respectively, on at least one surface of the assemblage.

* * * * *